US007102703B1

(12) United States Patent
Mathew et al.

(10) Patent No.: US 7,102,703 B1
(45) Date of Patent: *Sep. 5, 2006

(54) LIQUID CRYSTAL DISPLAY ASSEMBLY FOR REDUCING OPTICAL DEFECTS

(75) Inventors: Ranjan J. Mathew, San Jose, CA (US); Hem Takiar, Fremont, CA (US); Cade Murray, Fremont, CA (US); Tonya Fridlyand, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/256,702

(22) Filed: Feb. 24, 1999

(51) Int. Cl.
*G02F 1/1333* (2006.01)
*G02F 1/1345* (2006.01)

(52) U.S. Cl. ........................ 349/60; 349/150
(58) Field of Classification Search .................. 349/58, 349/60, 150
See application file for complete search history.

(56) References Cited

U.S. PATENT DOCUMENTS 5,587,817 A * 12/1996 Miyamoto et al. .......... 349/187
5,677,745 A * 10/1997 Kawano et al. ............... 349/42
5,880,795 A *  3/1999 Nagata et al. ................ 349/58
6,034,751 A *  3/2000 Kamiya ........................ 349/60
6,356,334 B1 *  3/2002 Mathew et al. ............. 349/153
6,476,885 B1 * 11/2002 Murray et al. ................ 349/60

* cited by examiner

*Primary Examiner*—Dung T. Nguyen
(74) *Attorney, Agent, or Firm*—Beyer Weaver & Thomas LLP

(57) ABSTRACT

An improved packaged liquid crystal display (LCD) assembly is described. A recess is used to house a support material while the LCD cell 609 is positioned at least partially within the containment structure. A plurality of spaced apart stabilizers are attached from the sides of the LCD cell 609 to the substrate without transmitting residual stresses induced during fabrication and operation. A support material is dispensed in the recess such that it provides support for the LCD cell 609 without transmitting residual stresses from the substrate. The described arrangements permit an LCD assembly which minimizes the amount of forces and stresses that lead to optical defects. The stabilizers, in addition to supporting the cell, also act to contain the encapsulating material used to protect the bonding wires. The support material, in addition to minimizing transmission of stresses, also provides improved heat dissipation from the LCD cell 609. In another embodiment, a method for constructing the LCD assembly is described.

28 Claims, 15 Drawing Sheets

LIQUID CRYSTAL DISPLAY ASSEMBLY FOR REDUCING OPTICAL DEFECTS

RELATED APPLICATIONS

This application is related to application Ser. No. 09/130,631 filed Aug. 8, 1998, which is incorporated herein by reference.

FIELD OF THE INVENTION

The present invention relates, generally to liquid crystal display assemblies and, more particularly, relates to miniature liquid crystal display assemblies constructed to reduce optical defects.

BACKGROUND OF THE INVENTION

In the recent past, substantial research and development resources have been directed toward small scale Liquid Crystal Display (LCD) and light valve technologies. These miniature LCD assemblies are typically employed in high resolution projection displays, such as a reflective LCD projectors, SXGA formats (1,280×1,024 pixel resolution) and even HDTV formats (above 1,000 line resolution), or the like.

Briefly, as shown in FIGS. 1 and 2, a conventional small scale LCD assembly 20 is illustrated including a die 21 having a pixel array 22. This pixel array 22 is typically composed of rows and columns of electrically conductive pathways each forming an individual pixel (not shown). Each pixel can be individually changed to an "on" condition by selecting the appropriate row and column of pixel array 22. Positioned around or concentrated on one end of the pixel array are a plurality of die bond pads 23 which are internally connected to the pixel array 22 to enable operational control thereof. Selection of the appropriate pixel is controlled by control circuitry, either included within the die 21 or external to the die 21. In either configuration, external control signals may be used to control the functions of the die 21.

As best viewed in FIGS. 2 and 3, a transparent glass plate 24 is typically placed over the die 21 and the pixel array 22, such that a portion of the glass plate 24 overhangs the die 21. The glass plate 24 is usually affixed to die 21 through an adhesive seal 25 which together cooperate to define a sealed volume encompassing the pixel array 22. This sealed volume is then commonly filled with a solution 26 of liquid crystal material such as Twisted Nematic Liquid Crystals (TNLC). To facilitate grounding of the glass plate 24, a conductive coating (not shown) may be deposited over the undersurface 28 thereof.

The die 21 is typically rigidly or semi-rigidly mounted to a substrate 27 for mounting support and to facilitate heat conductive dissipation for the die. A conductive adhesive 29 (FIG. 3), such as a conductive epoxy, is generally applied to the undersurface 28 of the die 21 to adhere the die directly to the top surface of the substrate 27. In this manner, a heat conductive pathway is created directly between the die and the substrate to dissipate heat generated by the die.

The substrate 27 generally includes a plurality of substrate bond pads 30 which are typically wire bonded to the die bond pads 23 through bonding wires 31. Finally, an encapsulating material 32 is applied to seal die 21 to substrate 27. The encapsulating material 32 (FIG. 3) normally encapsulates the bonding wires 31 and the internal elements of die 21 without obscuring a view of the pixel array 22 through the glass plate 24.

By activating the appropriate pixels, the corresponding liquid crystals in the TNLC, deposited in sealed volume, are caused to either align or rotate through an appropriate polarizer. Upon alignment, light is permitted to pass through the aligned crystals and the adjacent glass plate, thus appearing light in color. In contrast, when the liquid crystals are rotated, light is prevented from passing therethrough and, hence the glass plate 24, so that the corresponding pixel appears dark in color.

One important aspect in the proper operation of these small scale LCD or light valve assemblies is the maintenance of proper distance uniformity (typically about 2–4 μm) between the pixel array and the undersurface 33 of the glass plate. Variances in these distances may often times cause the pixel array to function improperly or cause operational failure.

One problem with conventional rigid display device constructions where the substrate 27, the glass plate 24 and the silicon die 21 are all attached are optical defects due to warping. Since the structures are composed of different materials or composites that have different coefficients of expansion, they expand at different rates and cause each other to warp. As a result of this deformation, depending in part upon the construction processes, significant residual stresses may be induced upon the cell. At a minimum, these internal stresses cause optical defects such as variations in color uniformity and fringes, and variations in the cell gap thickness which may cause optical shadows. As these optical defects may be produced by deformations as small as 0.25 microns, minor stresses may substantially reduce optical quality.

This is especially true since the undersurface 28 of the die 21 is typically rigidly affixed or attached directly to the substrate 27. For example, when the substrate 27 and the die 21 are both composed of a silicon material, upon heating, the glass plate 24 expansion tends to negatively bow or warp (FIG. 4) at a rate greater than that of the substrate 27. Upon more extensive high temperature thermal cycling during operation, additional occurrence of optical fringes and optical non-uniformity may even further compromise the performance of the LCD assembly.

In contrast, when the die 21 is composed of a silicon material and the substrate 27 is composed of a more conductive material, such as aluminum, upon heating, the substrate expansion tends to positively bow or warp (FIG. 5) the substrate at a rate greater than that of the die 21 and glass plate 24. As viewed in the cross-sectional view of FIG. 5, central thinning of the cell is caused which results in defects such as discoloration and the appearance of optical shadows.

Another cause of optical defects due to stress occurs during construction of the small scale LCD assembly 20. Commonly, the encapsulating material 32 used to protect the bonding wires 31 may surround the glass plate 24 and the silicon die 21. As the encapsulating material 32 is cured, differences in thermal expansion between the encapsulating material 32 and the glass plate 24 or the silicon die 21 may lead to peripheral deformation of the glass plate 24 or the silicon die 21, leading to further stressing and optical defects.

In view of the foregoing, it should be apparent that improved LCD assembly and construction techniques would be desirable.

SUMMARY OF THE INVENTION

An improved packaged liquid crystal display (LCD) assembly is described in which the cell liquid crystal cell is suspended. More specifically, a plurality of spaced apart stabilizers are attached from the sides of the LCD cell to the substrate without transmitting residual stresses induced during fabrication and operation. The stabilizers additionally do not adhere the bottom surface of the LCD cell to the containment structure.

In one preferred embodiment, a support material is dispensed in the containment chamber such that it provides support for the LCD cell without transmitting residual stresses from the substrate. In some embodiments, the LCD cell is dispensed on top or partially within the support material.

The LCD assembly generally includes a liquid crystal cell including a die having a pixel array, a transparent plate attached to the die, and a liquid crystal material disposed in a gap region between the die and the transparent plate. A containment chamber is used to house a support material while the LCD cell is positioned at least partially within the containment structure.

The described arrangements have numerous advantages and permit an LCD assembly which minimizes the amount of forces and stresses that lead to optical defects. The stabilizers, in addition to supporting the cell, also act to contain an encapsulating material used to protect the bonding wires. The support material, in addition to minimizing transmission of stresses, also allows improved heat dissipation from the LCD cell.

In another embodiment, a method for constructing the LCD assembly is described. As a result of the reduced temperature sensitive curing involved in the present invention, cycle time, or the time required to construct the LCD assembly, is reduced to less than five hours.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
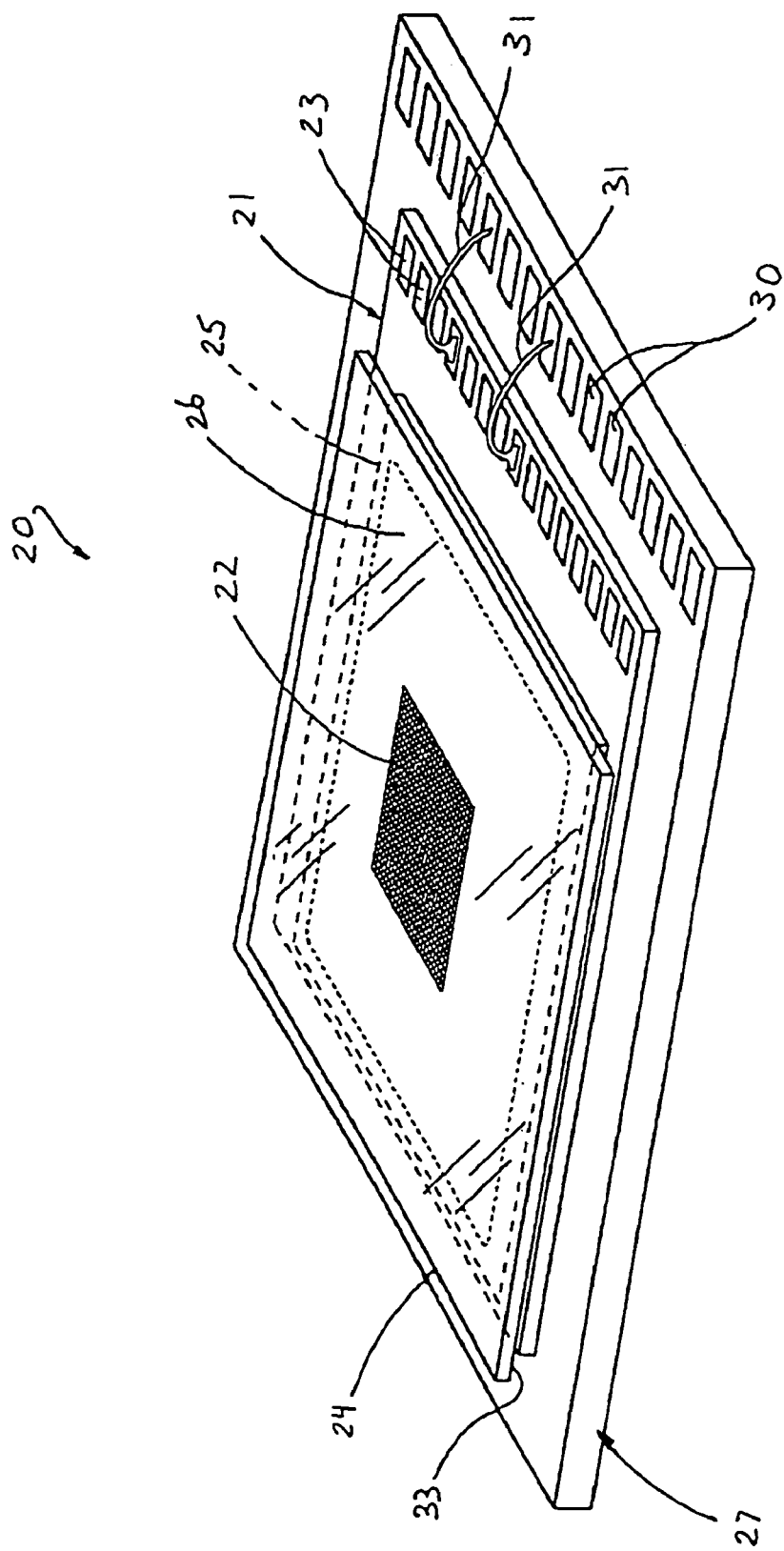
FIG. 1 is a top perspective view of a prior art Liquid Crystal Display (LCD) assembly illustrating a die rigidly mounted to a substrate.
Figure 2:
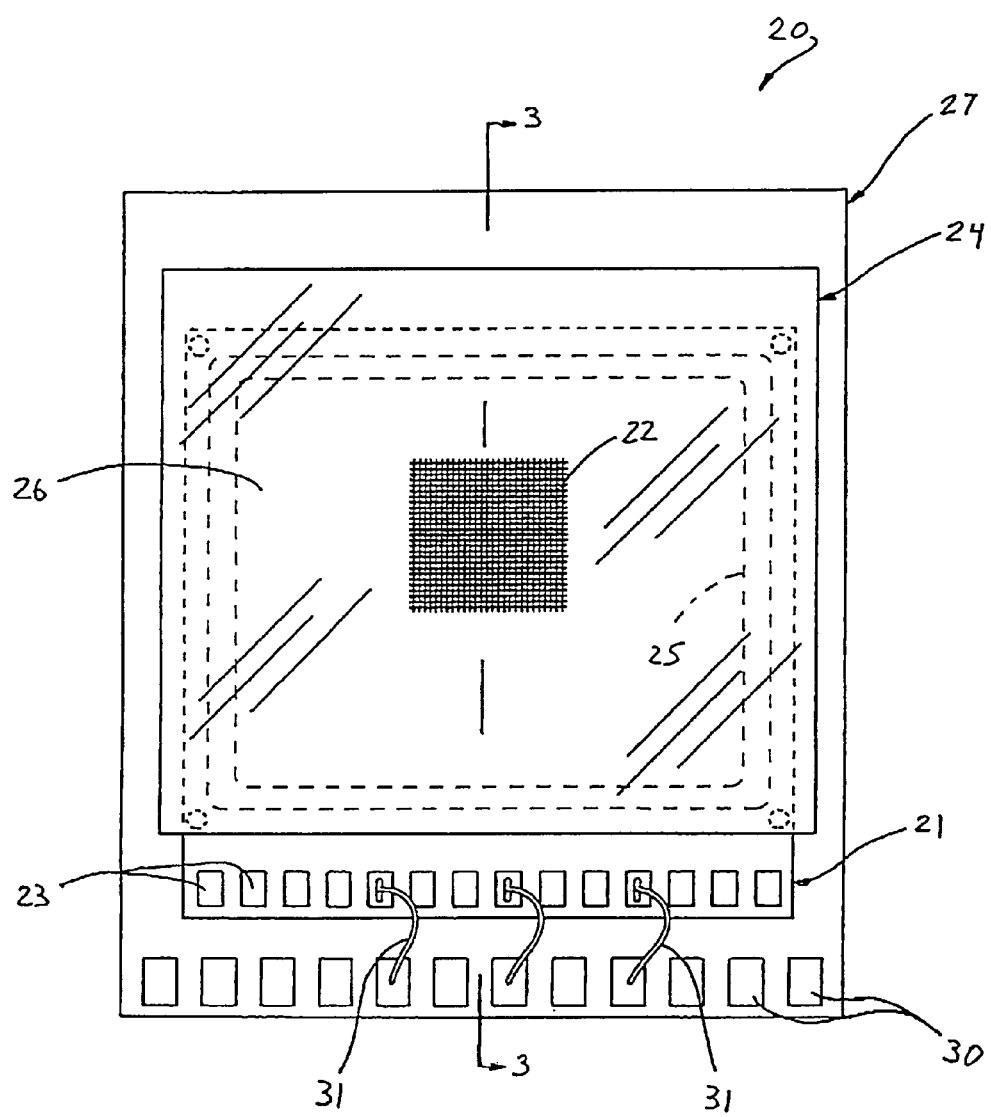
FIG. 2 is a top plan view of the prior art LCD assembly of FIG. 1.
Figure 3:
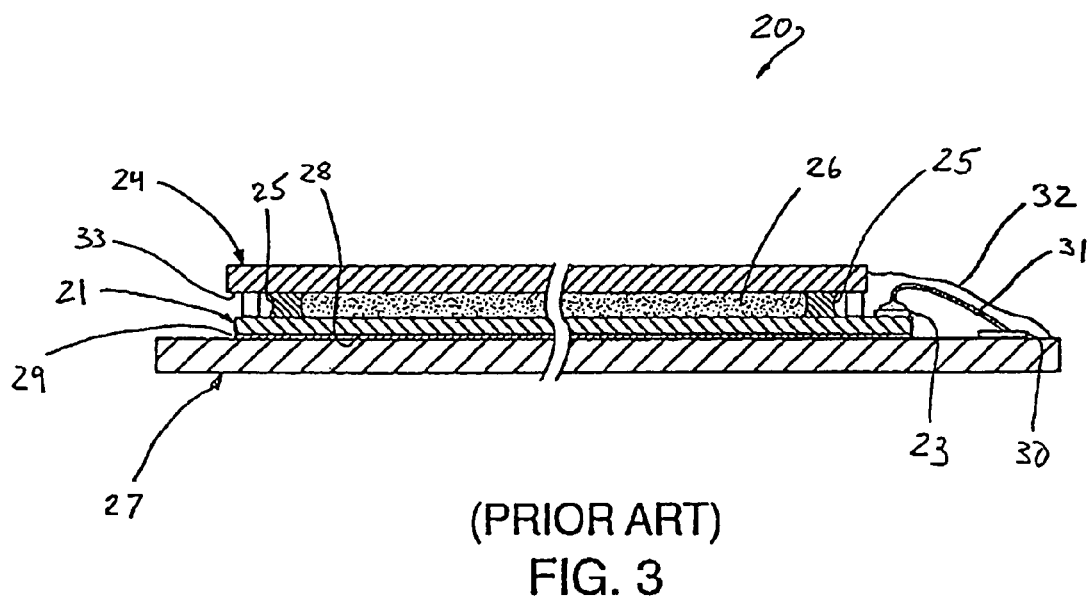
FIG. 3 is an enlarged, fragmentary, side elevation view, in cross-section, of the prior art LCD assembly taken substantially along the plane of the line 3—3 in FIG. 2.
Figure 4:
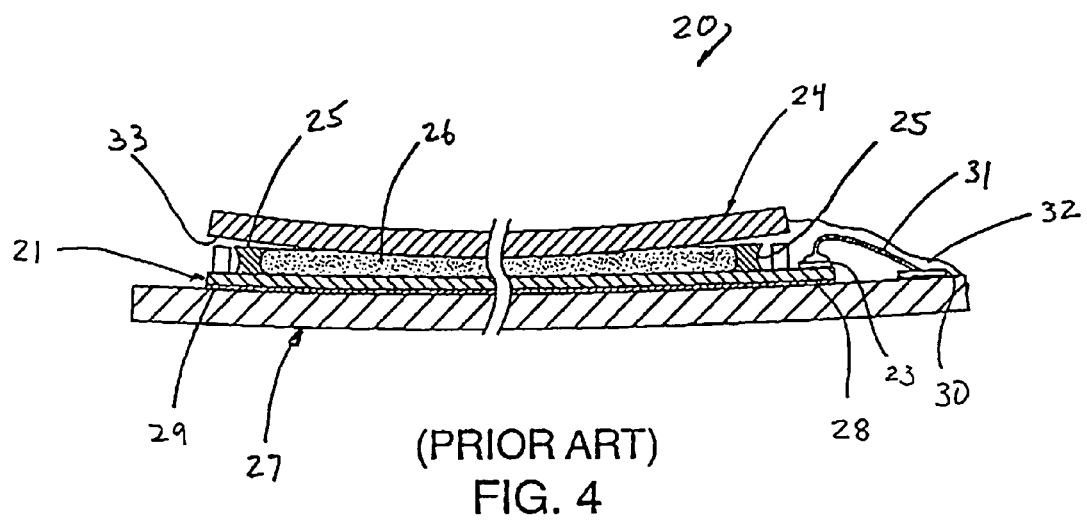
FIG. 4 is a fragmentary, side elevation view, in cross-section, of the prior art LCD assembly of FIG. 3, and illustrating delamination of the transparent plate from the die resulting from a negative bow configuration.
Figure 5:
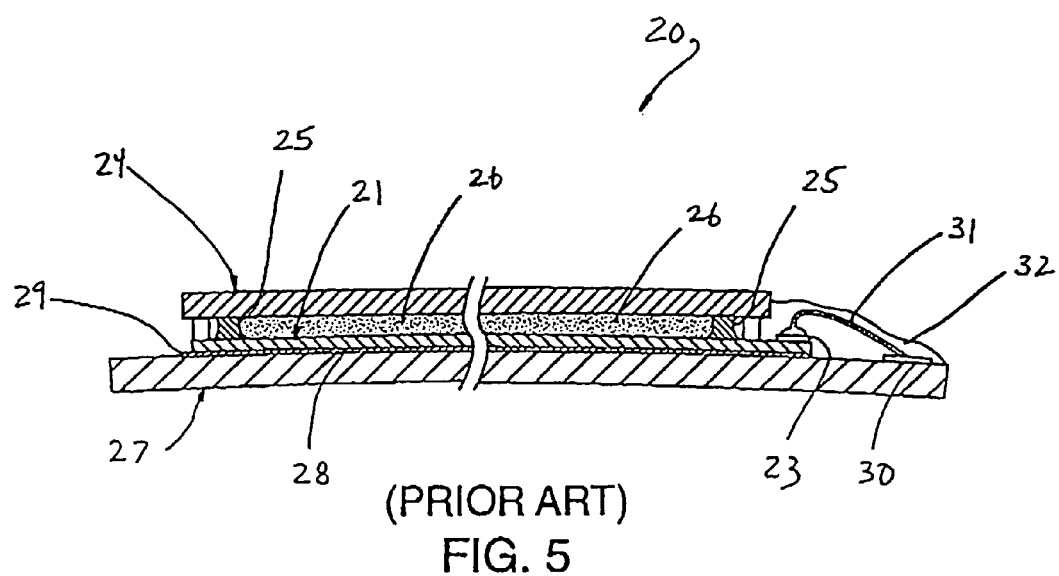
FIG. 5 is a fragmentary, side elevation view, in cross-section, of the prior art LCD assembly of FIG. 3, and illustrating a positive bow configuration.
Figure 6:
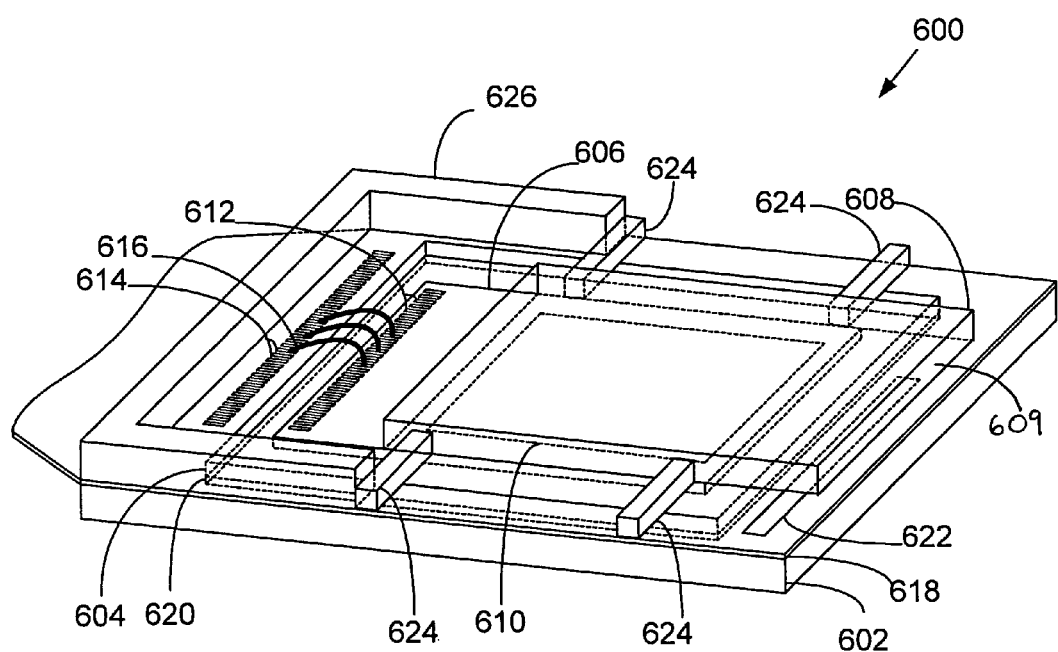
FIG. 6 is a top perspective view of an exemplary Liquid Crystal Display (LCD) assembly in accordance with one embodiment of the present invention in which a plurality of stabilizing members are used to support the LCD cell.

In the following detailed description of the present invention, numerous specific embodiments are set forth in order to provide a thorough understanding of the invention. However, as will be apparent to those skilled in the art, the present invention may be practiced without these specific details or by using alternate elements or processes. In other instances well known processes, procedures, components, and circuits have not been described in detail so as not to unnecessarily obscure aspects of the present invention.

Referring initially to FIGS. 6–9, a small scale liquid crystal display (LCD) assembly 600 according to one embodiment of the present invention will be described. The liquid crystal display 600 includes a substrate 602 having a recess 604 that acts as a containment chamber for receiving a die 606 attached to a transparent plate 608. A liquid crystal material is disposed between the die 606 and the transparent plate 608. Generally, the die 606, the transparent plate 608 and the liquid crystal material and other components between the die and transparent plate are collectively referred to as an LCD cell 609. The die 606 includes a pixel array 610 and a plurality of die bond pads 612. The pixel array 610 is responsible for producing the images that are shown on the liquid crystal display. The die bond pads 612 allow electrical communication with external devices. A cantilevered ground trace 622 passively contacts the transparent plate 608 to further ground the LCD cell.

In an embodiment of the present invention, a support material or thermal grease 620 is disposed in the recess 604. The support material 620 is arranged to support the LCD cell 609 in a floating relationship. A plurality of spaced apart stabilizers 624 are used to support the LCD cell 609. In one embodiment, the stabilizers 624 connect the substrate 602 to the sides of the LCD cell 609, as for example to the sides of transparent plate 608. The stabilizers 624 are formed from an elastic material and provide the principle means of holding the LCD cell 609 in place. With the described arrangement, the LCD cell 609 is substantially insulated from stresses and/or warpage induced by the substrate 602.

In the embodiment shown, a pair of the stabilizers 624 also act, along with a barrier 626, to retain an elastomeric encapsulating material (not shown in FIG. 6) used to protect bonding wires 616 that electrically couple the die to external elements. As described in more detail below, these barriers effectively limit the encapsulating material to one end of the LCD cell 609. Thus, the primary elements that mechanically couple the LCD cell to substrate are the stabilizers 624. The only other elements that provide any additional mechanical coupling are the cantilevered ground trace 622 and the encapsulating material. The cumulative effect of the described structure minimizes the residual stress on the LCD cell. The reduced stresses reduce the possibility of externally induced warpage occurring within the LCD assembly 600, during both construction and operation of the device, which in turn reduces the probability of internal stress induced optical defects, including variations in color uniformity and fringes, and optical shadows.

Figure 7:
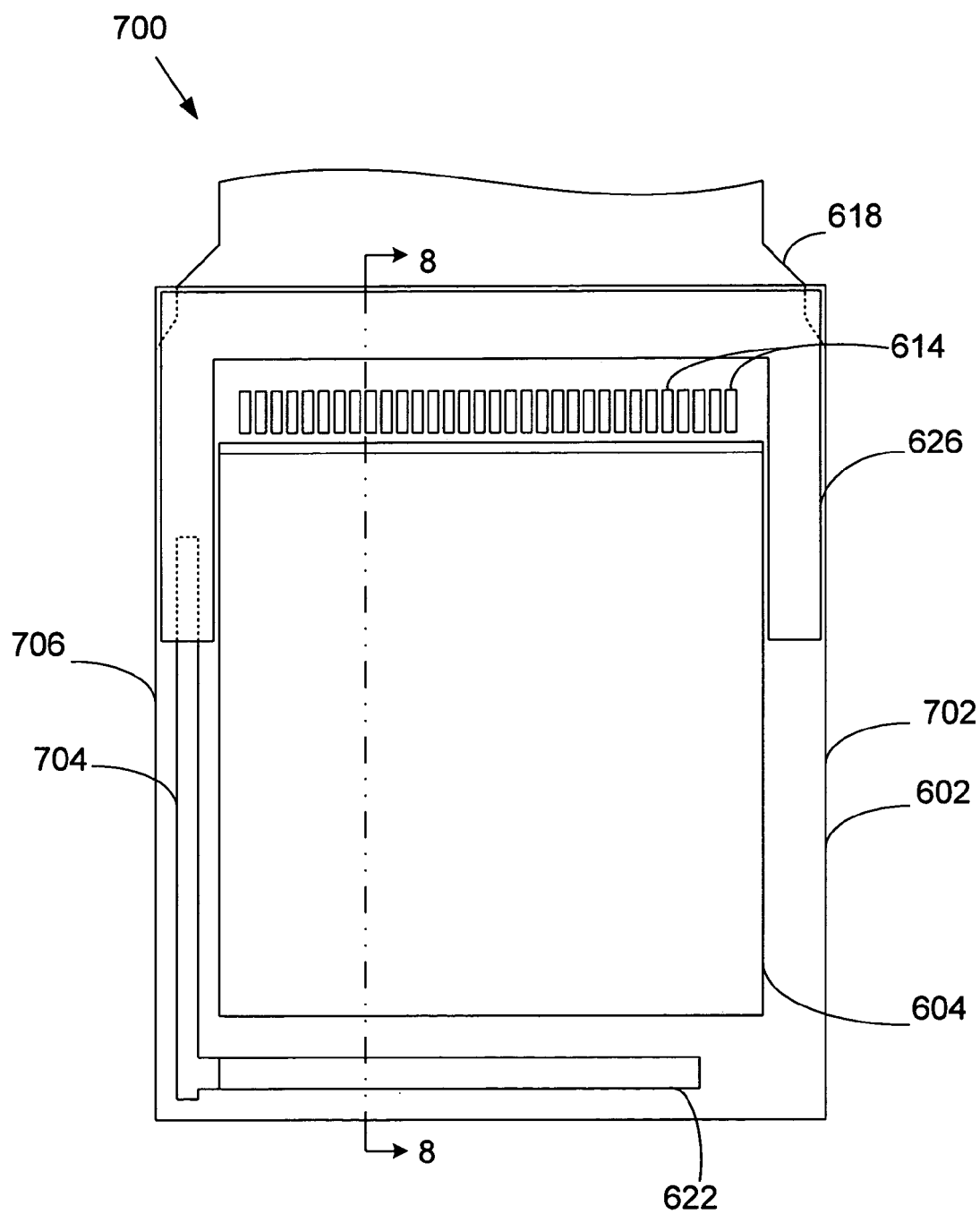
FIG. 7 is a top plan view of a substrate assembly that is used to package the LCD assembly of FIG. 6.
Figure 8:
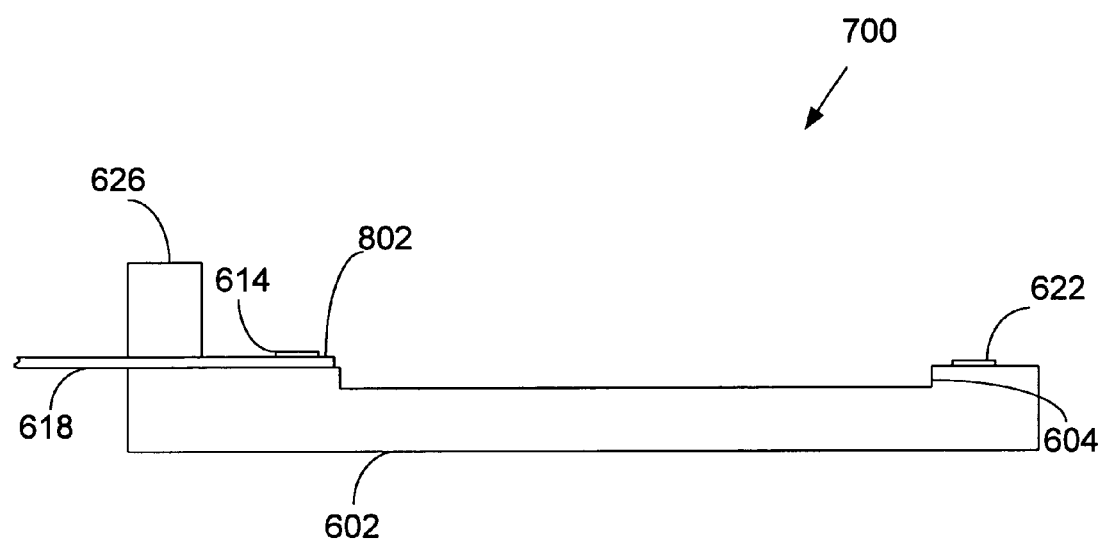
FIG. 8 is an enlarged, side elevation view of a substrate assembly 700 that is used to package the LCD assembly of FIG. 6 taken substantially along the plane of the line 8—8 in FIG. 7.

Referring next to FIGS. 7–15, the packaging of a small scale liquid crystal display (LCD) assembly 600 according to one embodiment of the present invention will be described in more detail. FIGS. 7 and 8 illustrate a substrate assembly 700 that is used to package the LCD cell. The substrate assembly 700 includes a substrate 602 which is used as the base of the LCD assembly 600. Any suitable type of substrate may be utilized in accordance with the present invention. The substrate 602, may take any suitable form including simple substrate blocks, chip carriers, leaded chip carriers, as well as other types of substrates which can be used for packaging the LCD cell 609. In the described embodiment, the substrate 602 is simply a machined aluminum block. Alternately, the substrate 602 may include Alloy Ash 42, a ceramic alloy, a combination of materials (ie. plastic and metal), or any material with a coefficient of thermal expansion which substantially facilitates less induced stress in the die 606. The substrate 602 includes a recess 604 sized to accommodate the LCD cell 609. The recess 604 is peripherally larger than the periphery of the die 606 so that the walls of the recess do not rigidly contact the die 606.

A thin printed circuit flex tape 618 is attached to the top surface 802 of the substrate 602 to serve as a connection to external circuitry. The printed circuit flex tape 618 may be formed from any suitable material such as polyimide tape and includes a plurality of tape bond pads 614 positioned to permit wire bonding to the die bond pads 612 of the LCD cell 609. The flex tape 618 further includes a conductive ground trace 704 which is electrically connected to the cantilevered ground trace 622 to facilitate grounding the transparent plate 608.

The cantilevered ground trace 622 is a pre-shaped thin metal strip which permits passive contact between the ground trace 704 and the transparent plate 608. The spring tension of the thin metal strip is such that it does not induce substantial stresses in the transparent plate 608 and thus does not cause optical defects in the LCD assembly 600. In operation, the cantilevered ground trace 622 serves to ground the transparent plate 608.

The substrate assembly 700 also includes a barrier 626 which is used in subsequent containment of the encapsulating material. In the embodiment shown, the barrier 626 is attached to the top surface of the substrate 602 and surrounds the external bond pads 614 and a portion of the recess 604. Barrier 626 may be formed from a variety of materials such as a molded plastic or other material capable of acting as a dam for the encapsulating material. In this embodiment, the barrier 626 is attached to the substrate 602 prior to placement of the LCD cell 609. Alternately, the barrier 626 may be attached to the substrate subsequent to the placement of the LCD cell 609.

Figure 9:
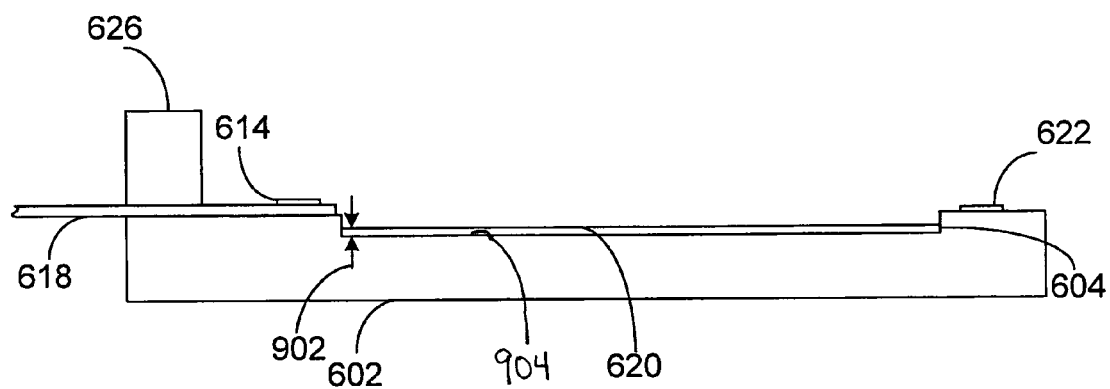
FIG. 9 is the substrate assembly of FIG. 8 further including a thermal grease.

A thermal grease is placed in the substrate recess 604 to support the liquid crystal cell in a "floating" relationship relative to the substrate 602. That is, the liquid crystal cell is not adhered or otherwise attached to the bottom surface of the recess. In this manner, forces and residual stresses induced by the substrate 602 will not be transmitted directly to the die 606, and thus stress induced optical distortions can be significantly reduced. As best illustrated in FIG. 9, the thermal grease 620 is placed in the recess 604 to a depth 902. The depth of the thermal grease may be widely varied, however, by way of example, gap distances between the undersurface of the die 606 and the recess bottom 904 in the range of approximately 0.3 mm to about 0.8 mm work well.

Since the thermal grease 620 contacts both the die 606 and the substrate 602, it forms a thermally conductive pathway to facilitate heat dissipation from the LCD cell 609 (and particularly the die) to the substrate 602. Preferably, the thermal grease 620 has a high thermal conductivity. A wide variety of materials may be used as the thermal grease 620. By way of example, Dow Corning 340 silicone heat sink compound works well. Additional properties which may be advantageous for the thermal grease 620 include constant viscosity, thermal stability, low thermal expansion and insensitivity to curing practices.

Figure 10:
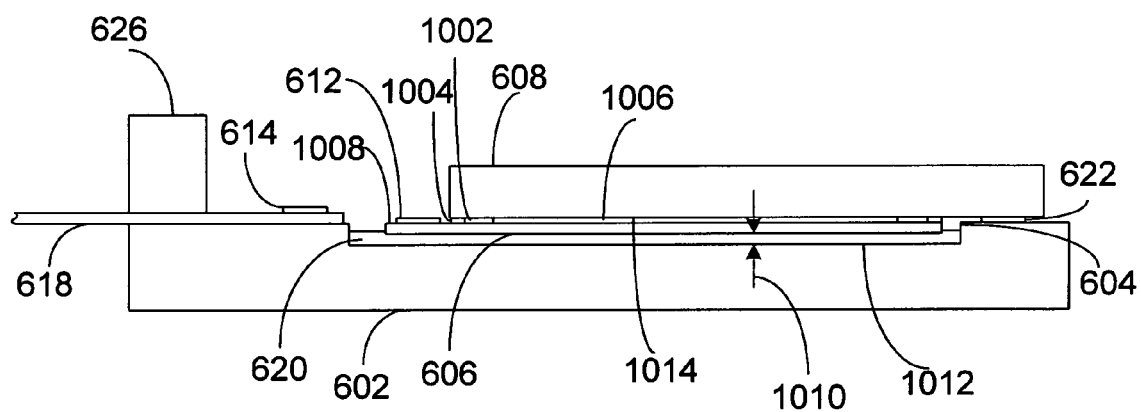
FIG. 10 is the substrate assembly of FIG. 9 further including an LCD cell disposed partially in the thermal grease.
Figure 11:
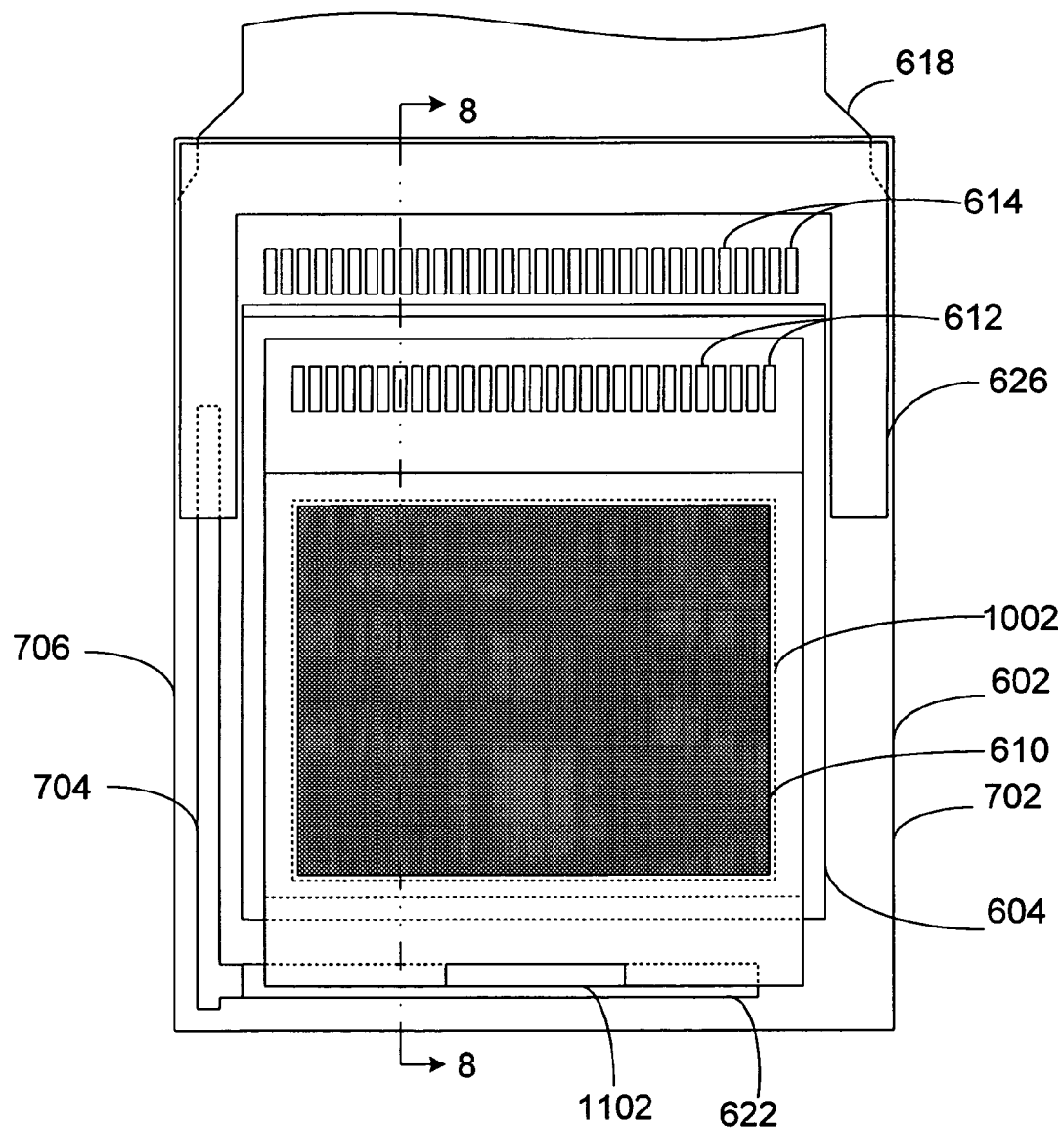
FIG. 11 is the substrate assembly of FIG. 7 further including an LCD cell disposed partially in the thermal grease.

After the grease 620 has been placed in the recess 604, the LCD cell 609 is then placed in the recess 604 as shown in FIGS. 10 and 11. The LCD cell 609 typically includes the die 606, the transparent plate 608, and a liquid crystal material disposed therebetween. The die 606 includes a pixel array 610 and plurality of die bond pads 612. The composition of transparent plate 608 may be of any suitable material such as glass and plastic, or the like, which provides substantial rigidity and a suitable adhesive surface for the stabilizers 624. While the transparent plate 608 is rectangular in this embodiment, it will be understood that the transparent plate 608 may be any geometric shape sufficient to cover the pixel array 610 of the die, while further sufficiently mounting to the LCD cell 609 via the stabilizers 624.

The transparent plate 608 passively contacts the cantilever ground trace 622. As mentioned previously, the spring tension of the thin metal strip is preferably such that it does not induce substantial stress in the transparent plate 608. A ledge portion 1102 of the transparent plate 608 is planarized to allow flexible contact with the cantilever ground trace 622. In this manner, contact between the two members may be flexibly located along the planarized ledge. This arrangement is beneficial since the passive contact substantially reduces and minimizes any expansive effects along the axis extending generally perpendicular to the top surfaces of the transparent plate 608.

The construction of the LCD cell 609 may be varied as will be appreciated by those skilled in the art. By way of example, one suitable LCD cell 609 construction is described in application Ser. No. 09/130,631 filed Aug. 8, 1998. Briefly, the small scale LCD assembly 600 includes a pixel array 610 formed on the die 606. The die bond pads 612 are electrically coupled to the pixel array 610 through internal circuitry (not shown) to facilitate control of the pixel array 610. An adhesive seal 1002 is formed around the pixel array 610 on the top surface of the die 606 and acts to adhere the transparent plate 608 to the die 606. This adhesive seal 1002 seals a volume between the transparent plate 608, die 606, and within the perimeter of the adhesive seal 1002. Pixel array 610 is enclosed within this sealed volume. In addition, precision conductive spacers 1004 may also be employed to facilitate a uniform spacing between the pixel array 610 and the transparent plate 608.

Figure 12:
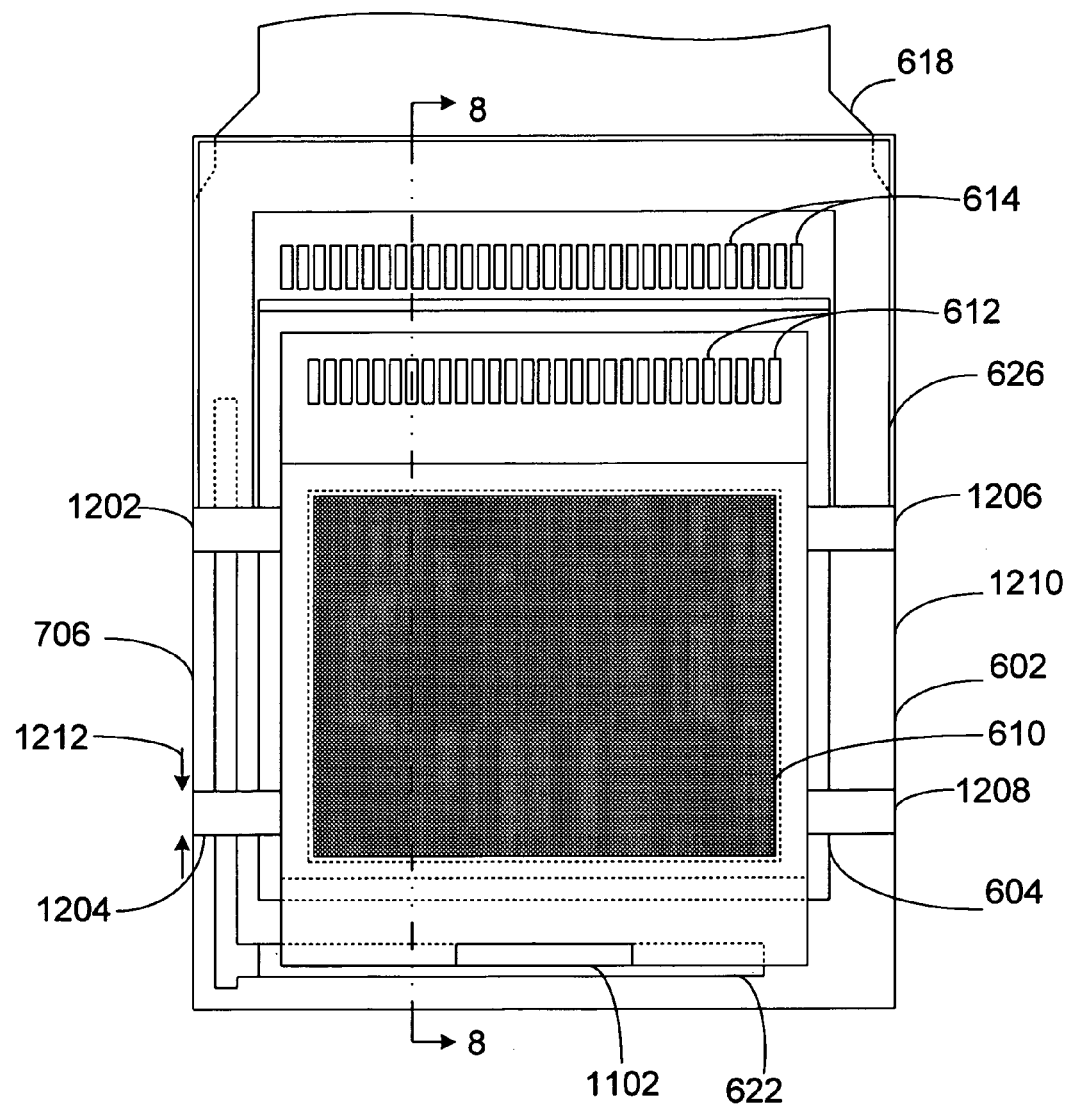
FIG. 12 is the substrate assembly of FIG. 11 further including a plurality of stabilizers attached to the transparent plate of the LCD cell.

To continue with construction of LCD assembly 600, stabilizers 1202, 1204, 1206 and 1208 are attached to the LCD cell 609 as shown in FIG. 12. Collectively, the stabilizers 624 provide non-rigid support for the LCD cell 609 from the substrate 602. In this embodiment, the stabilizers 624 are connected between the substrate and the sides of the transparent plate 608. Preferably, the stabilizers connect to the side of the LCD cell 609 and not the undersurface or upper surface of the die 606 or the transparent plate 608. The stabilizers are preferably sufficiently compliant such that they do not induce detrimental stresses in the LCD assembly during subsequent construction or operation. However, they must be sufficiently stiff to prevent movement of the LCD cell 609 within the recess.

The stabilizers 624 may be of any material that adheres to the substrate 602 and corresponding member of the LCD cell 609 and provides sufficient support. As an example, an epoxy or UV acrylate may be used. The stabilizers 624 may be of any shape and size to provide sufficient support and contain the encapsulating material. In one embodiment of the present invention, the stabilizers 624 take on a globular form in which the thickness of a stabilizer is less than the thickness of the transparent plate 608. In another embodiment, the stabilizer material is such that it changes properties after a curing operation. For example, stabilizer 624 may change from a liquid material before curing to an elastomeric or rubbery material after curing.

It is noted that the thermal grease helps control the thickness of the stabilizers 624 since it prevents any stabilizer materials from reaching the underside of the die 606. This protection is advantageous since any stabilizer material which adheres to the bottom surface of the die 606 may potentially induce stresses upon curing. Similarly, the thermal grease 620 prevents the encapsulating material used to protect the bonding wires 616 from attaching to the undersurface of the die as well.

In the embodiment shown in FIG. 12, a pair of stabilizers 624 are provided on each of two opposing sides of the LCD cell 609. It should be apparent that the number, size and position of the stabilizers may be varied as long as they provide a substantially mechanically stable system. By way of example, six or eight stabilizers may be used in a variety of positions around the LCD cell 609. Alternately, three stabilizers arranged in a balanced triangular arrangement may work in some situations as well (e.g., wherein two stabilizers are on one side of the recess and the third is situated on the opposing side of the recess 604. It is noted that the stabilizers 624 are only placed on two sides of the LCD cell. As explained below, the encapsulating material secures a third side of the LCD cell. By not attaching the fourth side, induced stresses within the LCD cell may be avoided.

The dimensions of the stabilizer 1202 may be widely varied in accordance with the needs of a particular system. By way of example widths on the order of 100 to 1800 mils, as for example 300 to 600 mils work well. By way of example, four stabilizers, each with a width 1212 of approximately 400 mils have been tested with success. It is understood that a single stabilizer may be wide enough such that it acts to provide the support of multiple stabilizers, such as stabilizers 1202 and 1204. In this manner, even two opposing stabilizers may be used to provide sufficient rigidity for the LCD cell 609. Preferably, the width 1212 is not so large as to induce stress of the LCD cell 609 within the width of the stabilizer as the stabilizer material cures. Thus, the width of stabilizers 624 may be varied so as to provide sufficient support for the LCD cell 609 but so large as to induce stress during curing of the stabilizer material.

Figure 13:
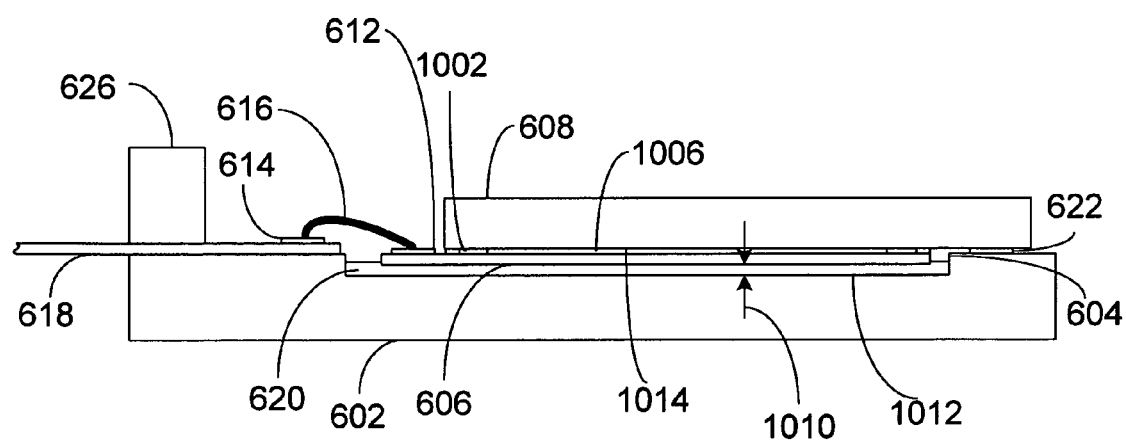
FIG. 13 is the LCD assembly of FIG. 6 including a plurality of wire bonds between the die and the substrate.
Figure 14:
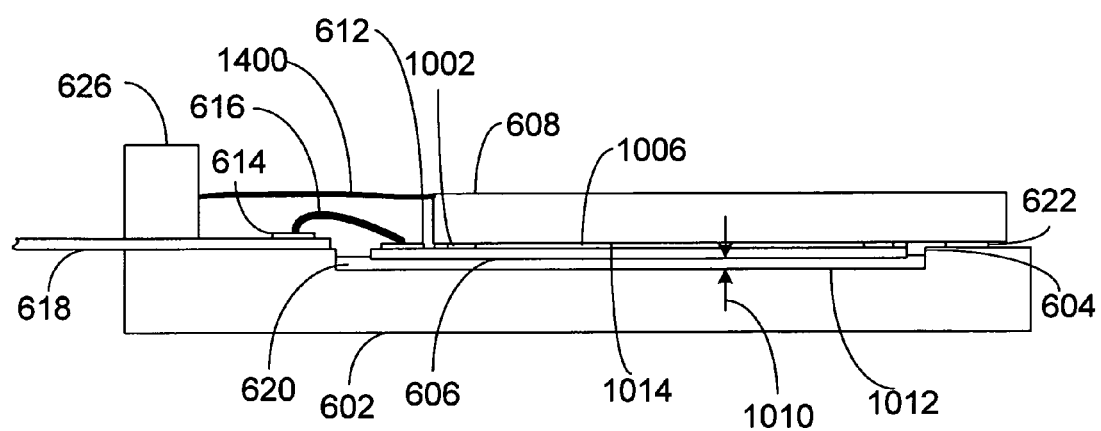
FIG. 14 is the LCD assembly of FIG. 13 further including the encapsulating material.
Figure 15:
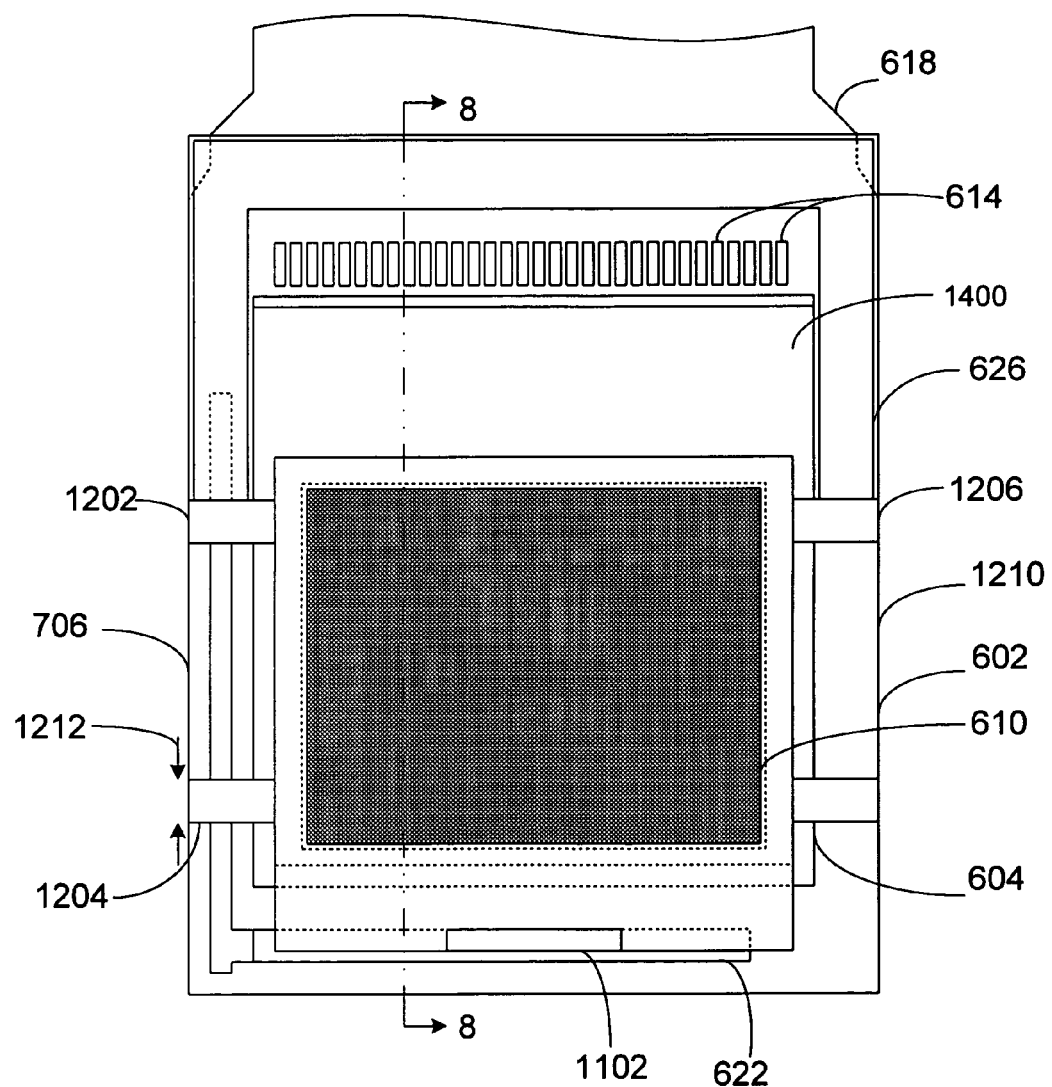
FIG. 15 is a top view of the LCD assembly of FIG. 14 including the encapsulating material.

After the LCD cell 609 has been attached to the substrate by the stabilizers, wire bonding is performed to electrically couple die bond pads 612 to the bond pads on flex tape 618 as best shown in FIG. 13. In the embodiment shown, the flex tape bond pads 614 are positioned adjacent just one end of the recess 602, which corresponds to where the die bond pads 612 are situated when the die 606 is seated within the recess 604. The bonding wires are then encapsulated using an appropriate encapsulating material 1400 (FIGS. 14 and 15) to protect the bonding wires 616 and bond pads. A wide variety of encapsulating materials may be used, however it is desirable that the encapsulating material have good elasticity.

In the embodiment shown, the encapsulating material 1400 is poured into the LCD assembly 600 using a glob topping type approach as opposed to injection molding. The barrier 626 is used in conjunction with the stabilizers 624 (FIGS. 14 and 15) to contain the encapsulating material 1400 at one end of the LCD cell 609. The encapsulating material is preferably chosen such that its thermal expansion properties do not imposed significant stresses on the LCD cell 609 during subsequent curing. Examples of materials which may be used for encapsulating material 1400 include OE107 Epoxy (Epoxy Technology Corp.) and LCM 35 UV curable acrylate (Ablestik Corp. of Rancho Dominquez, Calif.).

Figure 16:
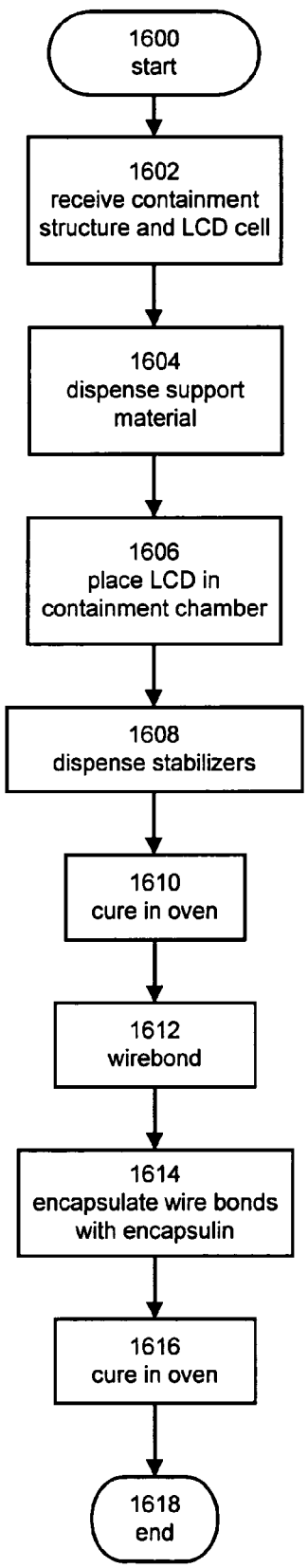
FIG. 16 is a flow chart, in accordance with one embodiment of the present invention, which illustrates the construction of an LCD assembly.

The construction of LCD assembly 600 according to a specific embodiment of the present invention will now be described with reference to flowchart 1600 of FIG. 16. The substrate assembly that includes a recess suitable for holding a LCD cell 609 is formed (step 1602). A thermal grease 620 is placed within the recess 604 (step 1604). The LCD cell 609 is then set within the recess 604 such that the die 606 rests upon or is partially submerged in the thermal grease 620 (step 1606). After the LCD cell 609 has been placed within the recess, the stabilizers 624 are formed between peripheral edges of the LCD cell 609 and the substrate 602 to secure the LCD cell 609 in place (step 1608).

The stabilizer material is then at least partially cured in an oven using an ultraviolet belt or other suitable means (step 1610). In a specific embodiment of the present invention, curing is performed at 70 degrees Celsius for approximately two hours although any suitable curing approach may be used. The die bond pads are then wire bonded to the external bond pads (step 1612). After wire bonding is completed, the encapsulating material 1400 is then dispensed to protect the bonding wires (step 1614). The encapsulating material is then cured in an oven as required. A brief cold cure may also be performed at this time at a relatively low temperature, such as a fifteen minute cure at minus forty degrees Celsius.

Since there is considerably less curing of temperature sensitive materials then in conventional LCD assemblies, both the threat of warpage during curing and the cycling time (i.e. the time required to package a device) are significantly reduced. Although only a few embodiments of the present invention have been described in detail, it should be understood that the present invention may be embodied in many other specific forms without departing from the spirit or scope of the invention. Particularly, although the invention has been described primarily in the context of a recess in the substrate 602, in alternative embodiments, the LCD containment structure may include walls on top of a substrate 602 or a wide variety of other structures. Additionally, barrier 626 used may be widely varied in accordance with the needs of a particular system. Barrier 626 may be further extended along the side of substrate to allow additional anchoring for the stabilizers. The barriers can be extended to form the walls of the containment chamer as well. Therefore, the present examples are to be considered as illustrative and not restrictive, and the invention is not to be limited to the details given herein, but may be modified within the scope of the appended claims.

What is claimed is:

1. A packaged liquid crystal display comprising:
    a containment structure having a recess formed in a surface of the structure;
    a liquid crystal cell including a die having a pixel array, a transparent plate attached to the die, and a liquid crystal material disposed in a gap region between the die and the transparent plate, the liquid crystal cell being positioned at least partially within the recess formed in the containment structure;
    a thermal support layer formed of thermal support material arranged in the recess underneath the liquid crystal cell enabling the liquid crystal cell to float on the thermal support layer; and
    a plurality of spaced apart stabilizers arranged to extend over the recess in the containment structure to couple edge portions of the liquid crystal cell to the containment structure without adhering the bottom surface of the liquid crystal cell to the bottom surface of the containment structure.

2. A packaged liquid crystal display as recited in claim 1 wherein the plurality of spaced apart stabilizers provide a mechanically stable system.

3. A packaged liquid crystal display as recited in claim 2 including four spaced apart stabilizers.

4. A packaged liquid crystal display as recited in claim 1 wherein the thickness of the thermal support material is between approximately 0.3 mm and 0.8 mm.

5. A packaged liquid crystal display as recited in claim 1 wherein thermal support material is a thermal grease.

6. A packaged liquid crystal display as recited in claim 1 wherein the plurality of spaced apart stabilizers prevent flow of an encapsulating material.

7. A packaged liquid crystal display as recited in claim 1 wherein each of the plurality of spaced apart stabilizers are anchored solely to the side of the liquid crystal cell.

8. A packaged liquid crystal display as recited in claim 1 wherein all the structures adhering to the cell have a rigidity less than the liquid crystal display.

9. A packaged liquid crystal display comprising:
    a containment structure having a top surface;
    a liquid crystal cell including a die having a pixel array, a transparent plate attached to the die, and a liquid crystal material disposed in a gap region between the die and the transparent plate, the liquid crystal cell being positioned at least partially within the containment structure;
    a thermal support layer formed of thermal support material arranged between the liquid crystal cell and the containment structure enabling the liquid crystal cell to float on the thermal support layer; and
    a plurality of spaced apart stabilizers arranged to couple edge portions of the liquid crystal cell to the containment structure without adhering the bottom surface of the liquid crystal cell to the bottom surface of the containment structure wherein the stabilizers are sufficiently compliant such that they do not induce substantial stresses in the LCD assembly.

10. A packaged liquid crystal display as recited in claim 9 wherein the containment structure includes a substrate having a recess therein, the liquid crystal cell being at least partially contained within the recess.

11. A packaged liquid crystal display as recited in claim 10 wherein the substrate includes one of aluminum or ceramic.

12. A packaged liquid crystal display as recited in claim 10 wherein the substrate is comprised of Alloy Ash 42.

13. A method of packaging a liquid crystal display assembly comprising:
    dispensing a thermal support material in a containment structure;
    disposing a liquid crystal cell at least partially within the containment structure and disposing the liquid crystal cell upon the thermal support layer so that the liquid crystal cell floats on the thermal support layer, the liquid crystal cell including a die having a pixel array, a transparent plate attached to the die, and a liquid crystal material disposed in a gap region between the die and the transparent plate; and
    forming a plurality of spaced apart stabilizers arranged to couple an edge portion of the liquid crystal cell to the containment structure without adhering the bottom surface of the liquid crystal cell to the bottom surface of the containment structure.

14. The method of claim 13 further including wire bonding a plurality of leads from the die to a plurality of leads on the containment structure.

15. The method of claim 14 further including depositing encapsulating material over the plurality of leads.

16. The method of claim 15 wherein the encapsulating material is prevented from surrounding the liquid crystal cell.

17. The method of claim 15 wherein a cycle time for a single cell is less than five hours.

18. The method of claim 13 wherein the plurality of spaced apart stabilizers are arranged in manner such that substantially no stresses are imposed on the liquid crystal cell.

19. The method of claim 13 wherein the thermal support material is disposed such that none of the plurality of spaced apart stabilizers are dispensed below the liquid crystal cell.

20. The method of claim 13 wherein the plurality of spaced apart stabilizers are anchored solely to the side of the liquid crystal cell.

21. A packaged liquid crystal display comprising:
    a containment structure having a bottom surface;
    a liquid crystal cell including a die having a pixel array, a transparent plate attached to the die, and a liquid crystal material disposed in a gap region between the die and the transparent plate, the liquid crystal cell being positioned at least partially within the containment structure; and
    a plurality of spaced apart stabilizers arranged to couple edge portions of the liquid crystal cell to the containment structure without adhering the bottom surface of the liquid crystal cell to the bottom surface of the containment structure, the stabilizers being sufficiently compliant such that they do not induce substantial stresses in the LCD assembly.

22. A packaged liquid crystal display as recited in claim 21 further comprising a support material arranged to support the liquid crystal cell in a floating manner within the containment structure.

23. A packaged liquid crystal display as recited in claim 22 wherein the support material includes a thermal grease.

24. A packaged liquid crystal display comprising:
    a containment structure having a recess formed in a portion of a top surface of the structure;
    a strip of tape mounted at an edge of the containment structure, the tape including a plurality of bond pads;

a raised barrier mounted at an edge of the containment structure on top of the strip of tape and arranged so that the bond pads are exposed;

a liquid crystal cell positioned at least partially within the recess formed in the containment structure, the cell including, a die having a pixel array, the die being wire bonded to the bond pads of the tape, a transparent plate attached to the die, and a liquid crystal material disposed in a gap region between the die and the transparent plate;

a thermal support layer formed of thermal support material arranged in the recess underneath the liquid crystal cell enabling the liquid crystal cell to float on the thermal support layer; and a plurality of spaced apart stabilizers arranged to couple at least two edge portions of the liquid crystal cell while leaving at least one edge of the cell open.

25. The display of claim 24 wherein the containment structure further includes a ground trace that extends along an edge of the containment structure and is in passive contact with the transparent plate.

26. The display of claim 25 wherein the ground trace is formed on a strip of tape that extends along an edge of the containment structure.

27. The display of claim 24 wherein the plurality of spaced apart stabilizers arranged to couple at least two edge portions of the liquid crystal cell are further configured to leave at least one edge of the cell open and not coupled with the cell to reduce induced stresses.

28. The display of claim 24 wherein the plurality of spaced apart stabilizers are arranged to extend over the recess in the containment structure.

* * * * *